(12) United States Patent
Haworth et al.

(10) Patent No.: US 7,685,061 B2
(45) Date of Patent: Mar. 23, 2010

(54) METHODS AND SYSTEMS FOR PROVIDING DEBT RECOVERY PARTNERSHIP

(75) Inventors: James A. Haworth, Herndon, VA (US); Robert L. Finnegan, Mechanicsville, VA (US); Derek C. Mohar, Boise, ID (US)

(73) Assignee: Capital One Financial Corporation, Falls Church, VA (US)

( * ) Notice: Subject to any disclaimer, the term of this patent is extended or adjusted under 35 U.S.C. 154(b) by 2791 days.

(21) Appl. No.: 09/795,120

(22) Filed: Mar. 1, 2001

(65) Prior Publication Data

US 2002/0123946 A1 Sep. 5, 2002

(51) Int. Cl.
*G06Q 40/00* (2006.01)

(52) U.S. Cl. .......................................... 705/38; 705/35

(58) Field of Classification Search ................... 705/35, 705/38

See application file for complete search history.

(56) References Cited

U.S. PATENT DOCUMENTS

| | | | |
|---|---|---|---|
| 5,991,733 A | 11/1999 | Aleia et al. | |
| 6,016,479 A | 1/2000 | Taricani, Jr. | |
| 6,532,450 B1 * | 3/2003 | Brown et al. | 705/40 |
| 6,999,943 B1 * | 2/2006 | Johnson et al. | 705/39 |
| 2003/0033245 A1 * | 2/2003 | Kahr | 705/39 |

FOREIGN PATENT DOCUMENTS

WO      WO 01/04810 A1      1/2001

OTHER PUBLICATIONS

60202713.*
Federal law sets strict rules for debt collectors Action Line; Federal law sets strict rules for debt collectors; [Indiana—Michigan—Mishawaka—PHM—Tribune Edition] Syril Kline. South Bend Tribune. South Bend, Ind.: Sep. 5, 1999. p. B.2.*
What They Know and Tell About You / Computers Stripping Away Privacy; [Final Edition] Kenneth Howe, Don Clark, Chronicle Staff Writers. San Francisco Chronicle (pre-1997 Fulltext). San Francisco, Calif.: Jun. 2, 1989. p. A.1.*
U.S. Appl. No. 2001/0005836 A1 published Jun. 28, 2001, Yang.
U.S. Appl. No. 2002/0077972 A1 published Jun. 20, 2002, Wilwerding.
CardReport, Collection Agency FAQ, 1999 [retrieved on Aug. 8, 2002 from the Internet at www.cardrepeort.com/credit-problems/collection-faq.html].

* cited by examiner

*Primary Examiner*—Lalita M Hamilton
(74) *Attorney, Agent, or Firm*—Finnegan, Henderson, Farabow, Garrett & Dunner, L.L.P.

(57) ABSTRACT

Methods and systems for collecting payments from customers having delinquent accounts are disclosed. Under a debt recovery partnership, a debt recovery service extends an offer for a debt recovery product to a customer with a delinquent account. If the offer is accepted, the debt recovery service receives an acceptance to the offer from the customer and, thereafter, pays a commission for the delinquent account to the partner. The partner ceases attempts to collect payments on the delinquent account corresponding to the accepted offer and continues attempts to collect payments on delinquent accounts not corresponding to an accepted offer.

15 Claims, 9 Drawing Sheets

METHODS AND SYSTEMS FOR PROVIDING DEBT RECOVERY PARTNERSHIP

FIELD OF THE INVENTION

The present invention generally relates to the field of debt recovery. More particularly, the invention relates to methods and systems for partnered companies to simultaneously work to recover debts owed by customers.

BACKGROUND AND MATERIAL INFORMATION

Credit issuing businesses of all sizes and types sometimes have problems with customers who are delinquent in paying off debt. Non-payment of debt, such as credit card debt, has cost businesses billions of dollars in revenue. Most credit issuers do not merely wait for delinquent customers to pay their debt. Instead, to recover all or a portion of the debt, they usually employ various tactics to collect payments from their customers.

Many credit issuers initially make an effort to collect overdue payments using some type of reminder, such as a letter or a phone call. Initial efforts are usually non-confrontational in case there has been a misunderstanding, such as the customer erroneously believing that all debt was previously paid or the credit issuer not receiving payments that actually were sent by the customer. A credit issuer often will receive payments from some customers in response to such a reminder. However, for other customers, the reminder will not be sufficient and their debts will remain unpaid.

Accounts that remain overdue for a lengthy period of time may be designated as a charged-off account. A charged-off account is an account on which a customer has not made a payment for a predetermined time period. Credit issuers consider charged-off accounts "written off" from their books (e.g., no longer receivable). Credit issuers may continue to attempt collection on charged-off accounts, but customers may no longer use the account to create further debt.

If initial collection efforts fail, some credit issuers resort to using debt collection agencies to collect payments from delinquent customers. For example, a credit issuer may give a number of charged off accounts to an agency, while retaining ownership of the accounts. When customers provide payments to the agency, the agency keeps a percentage (e.g., 50%) and forwards the remainder to the credit issuer. Credit issuers may also try selling a portfolio of charged off accounts to an agency. Under this arrangement, agencies essentially buy portfolios for a fraction of the debt amount (e.g., less than one cent per dollar) and attempt collection. Accordingly, a customer then owes the debt collecting agency instead of the original credit issuing business. However, the practice of buying portfolios of charged-off debt may not be very attractive to the purchasing agency. Some businesses believe the practice is high risk because there is a good chance that the customer will not pay.

Some businesses wish to avoid jeopardizing the relationship they have with their customers and continue to attempt collection themselves. For example, hospitals may not want to sell debt to collection agencies because they do not like forceful tactics, they are happy with the money they get from insurance, and/or want repeat business. Other motivations for businesses keeping control of debt include not wanting to lose control of that debt, not wanting to damage their reputations, and concern over the debt purchaser's compliance with the Fair Debt Collection Practices Act. Continuing collection attempts may result in a diversion of management time which would be better spent doing something more constructive.

Accordingly, there is a need for an improved method and system for collecting payments on charged-off accounts and other debt. There is also presently a need for a method and system for making the sale or purchase of debt more acceptable to businesses, so that debt can be more quickly recovered at less risk to businesses.

SUMMARY OF THE INVENTION

Methods and systems consistent with the principles of the invention provide a debt recovery partnership in which payments are collected from customers with debt. Under the debt recovery partnership, a debt recovery service extends an offer for a debt recovery product (such as a loan, debt recovery credit card, or agreement to buy a product or service from another company) to a customer having a delinquent account. If the offer is accepted, the debt recovery service processes an acceptance to the offer from the customer. Thereafter, the debt recovery service pays a commission for the delinquent account to a partner (such as a credit issuer). Thereafter, the partner ceases attempts to collect payments on the delinquent account corresponding to the accepted offer and continues attempts to collect payments on delinquent accounts not corresponding to an accepted offer.

Methods and systems consistent with the principles of the invention also synchronize accounts in a debt recovery service. The debt recovery service receives a periodical update from a partner reporting a payment collected from a customer having a delinquent account. The debt recovery service determines whether the delinquent account has been booked as a debt recovery credit card account or other debt recovery account. Subsequently, a determination is made as to whether the payment was made before a debt recovery credit card application for the debt recovery credit card account was received. If the payment was made to the partner before the debt recovery credit card application was received, then the debt recovery service modifies the debt recovery credit card account information.

Methods and systems consistent with the principles of the invention also collect payments from customers having delinquent accounts concurrently with a debt recovery service. A partner receives an indication from the debt recovery service that a delinquent account balance has been transferred to a debt recovery product by the debt recovery service. The delinquent account balance corresponds to a delinquent account of a customer that accepted an offer for the debt recovery product that permits the customer to pay off his or her debt under agreed terms. Subsequently, the partner ceases attempts to collect payments from the customer that accepted the offer and continues attempts to collect payments from customers that have not accepted an offer for a debt recovery product.

Methods and systems consistent with the principles of the invention also provide a debt recovery partnership in which payments are collected from customers with debt. A debt recovery partnership is established between a debt recovery service and a partner. Under the debt recovery partnership, a debt recovery service sends a customer having a delinquent account an offer for a debt recovery product (such as a loan, debt recovery credit card, or agreement to buy a product or service from another company). If the offer is accepted, the debt recovery service processes an acceptance to the offer from the customer. Thereafter, the debt recovery service pays a commission for the delinquent account to a partner (such as a credit issuer). Thereafter, the partner ceases attempts to collect payments on the delinquent account corresponding to the accepted offer and continues attempts to collect payments on delinquent accounts not corresponding to an accepted offer. The debt recovery service periodically updates account information using information received from the partner.

Methods and systems consistent with the principles of the invention also provide a debt recovery partnership in which payments are collected from customers with debt. Under the debt recovery partnership, a debt recovery service sends a customer having a delinquent account an offer for a debt recovery product (such as a loan, debt recovery credit card, or agreement to buy a product or service from another company). If the offer is accepted, the debt recovery service processes an acceptance to the offer from the customer. Thereafter, the debt recovery service purchases the delinquent account from a partner (such as a credit issuer). Thereafter, the partner ceases attempts to collect payments on the purchased delinquent account and continues attempts to collect payments on non-purchased delinquent accounts.

BRIEF DESCRIPTION OF THE DRAWINGS

The accompanying drawings are incorporated in and constitute a part of this specification and, together with the description, explain the features and principles of the invention. In the drawings.

DETAILED DESCRIPTION

The following detailed description of the invention refers to the accompanying drawings. While the description includes exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Methods and systems consistent with the principles of the invention enable debt recovery services to become partners with a charged-off debt owner or outsource agency to recover debt concurrently with them. Under a debt recovery partnership, the debt recovery service offers a debt recovery product (such as a loan, a debt recovery credit card product, or agreement to buy a product or service from another company) to customers at the same time the partner uses traditional methods to collect on the same accounts. The debt recovery service then buys from the partner only those accounts for customers who accept the debt recovery offer. Alternatively, the debt recovery service may transfer the balances of those accounts to the debt recovery product, without buying the accounts. In that case, the debt recovery service pays the partner a commission (e.g., a set amount or percentage) for transferred balances. The partner may no longer attempt to collect on the purchased accounts or accounts that correspond to transferred balances (e.g., accounts corresponding to accepted debt recovery offers). To facilitate this method, the debt recovery service may periodically reconcile the accounts when a change is made with either the partner or the debt recovery service.

Figure 1:
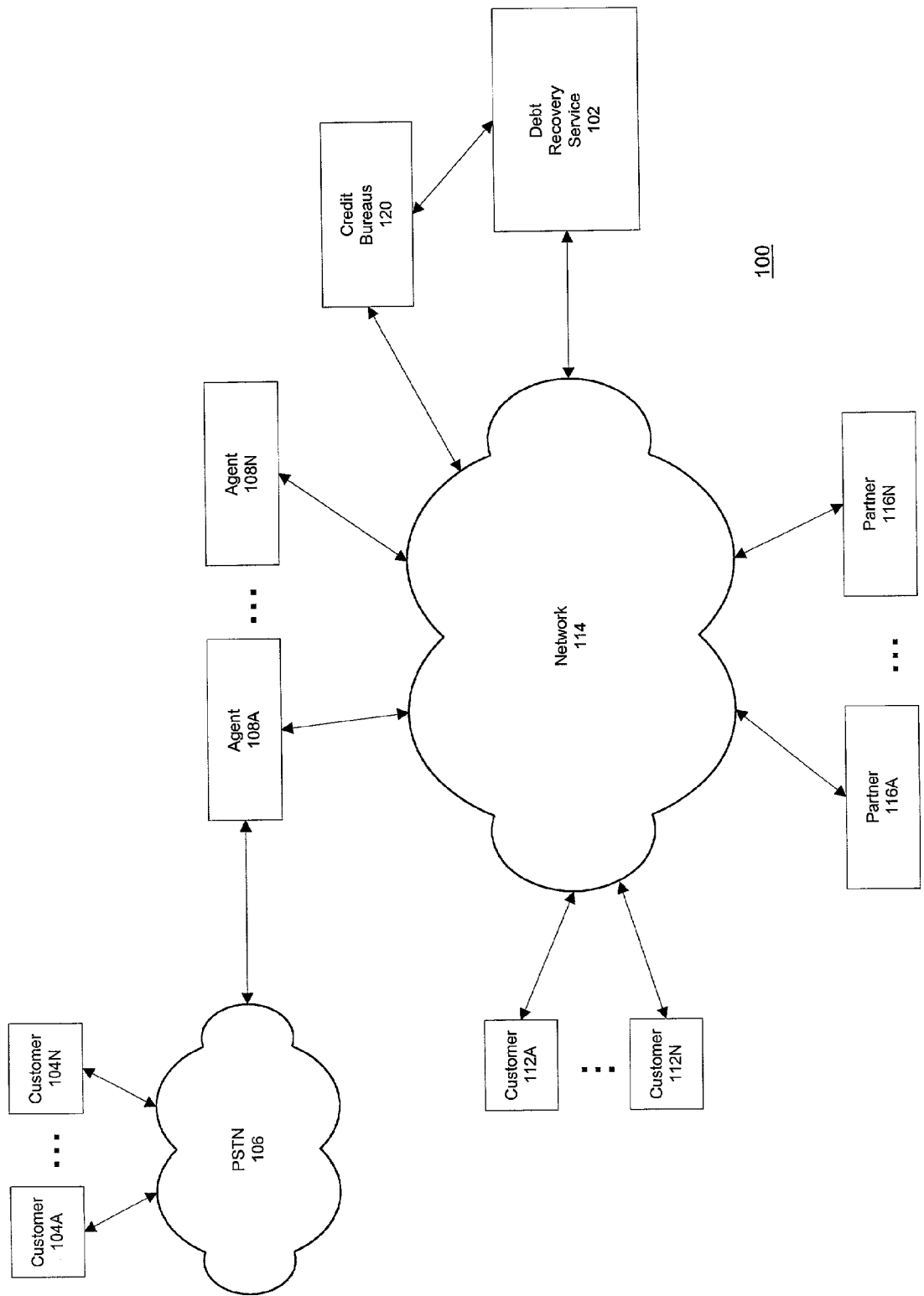
FIG. 1 is a diagram of an exemplary network environment in which the features and aspects of the present invention may be implemented.

FIG. 1 is a diagram of an exemplary network environment 100 in which the features and aspects of the present invention may be implemented. Network environment 100 includes debt recovery service 102, customers 104A through 104N, customers 112A through 112N, public switched telephone network (PSTN) 106, agents 108A through 108N, network 114, partners 116A through 116N, and credit bureaus 120. The components of FIG. 1 may be implemented through hardware, software, and/or firmware. The number of components in network environment 100 is not limited to what is shown.

Debt recovery service 102 may be a business that seeks companies to become partners with, for the purpose of attempting to collect payments on delinquent accounts owned by the sought after companies. Delinquent accounts may correspond to accounts which have been designated as charged-off. Charged-off accounts are those accounts on which customers have not made payments for a specified period of time. Companies vary as to the length of the time period before an account becomes charged-off, but the period is usually at least several months. Some companies set the time period at six months. Once an account is charged-off, that account is no longer considered a receivable account, and the customer is not permitted to accumulate any further debt on that account.

When debt recovery service 102 successfully forms a partnership with a company, such as partner 116A, it proceeds to make efforts to collect payments on delinquent accounts owned by the partner concurrent with the partner's own efforts to collect on the debt. For example, debt recovery service 102 may offer a delinquent customer, such as customer 104A or 112A, a debt recovery product, such as a loan or a debt recovery credit card product. A debt recovery credit card gives customers the opportunity to pay off their debts under terms agreed to with the debt recovery service 102. Customers agreeing to the offer receive a credit card with a particular credit limit, balance, and open to buy (OTB) amount (i.e., an amount of credit available to make purchases). In most cases, the balance is set to an amount previously owed in a delinquent account. Each customer then pays off his or her debt by making payments on the debt recovery credit card account.

Customers 104A-104N and 112A-112N correspond to customers who have an account that is delinquent. Each customer that accepts a debt recovery product offer can inform debt recovery service 102 of the acceptance via an appropriate communication channel, for example, PSTN 106, network 114 (which may comprise a wired or wireless communication network, including the Internet), electronic mail or regular mail (not shown). Agents 108A-108N are facilities associated with debt recovery service 102 for performing duties on behalf of debt recovery service 102. Alternatively, agents 108A-108N may be associated with (e.g., employed by) one or more partners 116A-116N. When one of the customers 104A-104N accepts a debt recovery product offer using a telephone, one of the agents 108A-108N can handle the call and submit an application for the debt recovery product to debt recovery service 102 on behalf of the customer. Moreover, agents 108A-108N can process acceptances received from any one of the customers 112A-112N via network 114 and submit an application to debt recovery service 102 on behalf of the customer. Agents 108A-108N may be external (as shown in FIG. 1) and/or internal to debt recovery service 102.

Partners 116A-116N are companies that own portfolios of delinquent (i.e., charged-off) accounts and have agreed to recover or work the debt on those accounts concurrently with debt recovery service 102. Partners 116A-116N may be the original issuer of credit or a company, such as a debt collection agency, that has bought a portfolio of delinquent accounts from another company. Partners 116A-116N send information to debt recovery service 102 showing payments made by customers who have been offered the debt recovery product, along with an indication of whether a debt recovery offer should remain valid. Partners 116A-116N also receive periodical reports from debt recovery service 102 indicating which customers have recently accepted the debt recovery offer.

Credit bureaus 120 are organizations that provide credit information. These organizations include, for example, Equifax, Experian, and Trans-Union. Credit bureaus 120 generally collect credit information and make it available to businesses that subscribe to their services. When a customer accepts a debt recovery offer, credit bureaus 120 receive a report from debt recovery service 102 or a partner indicating that the customer's previous debt is settled. Credit bureaus 120 also receive an indication from debt recovery service 102 that a new trade line should be opened for the debt recovery product. A trade line is credit information maintained for a particular customer, indicating that the customer has a line of credit with a company.

Figure 2:
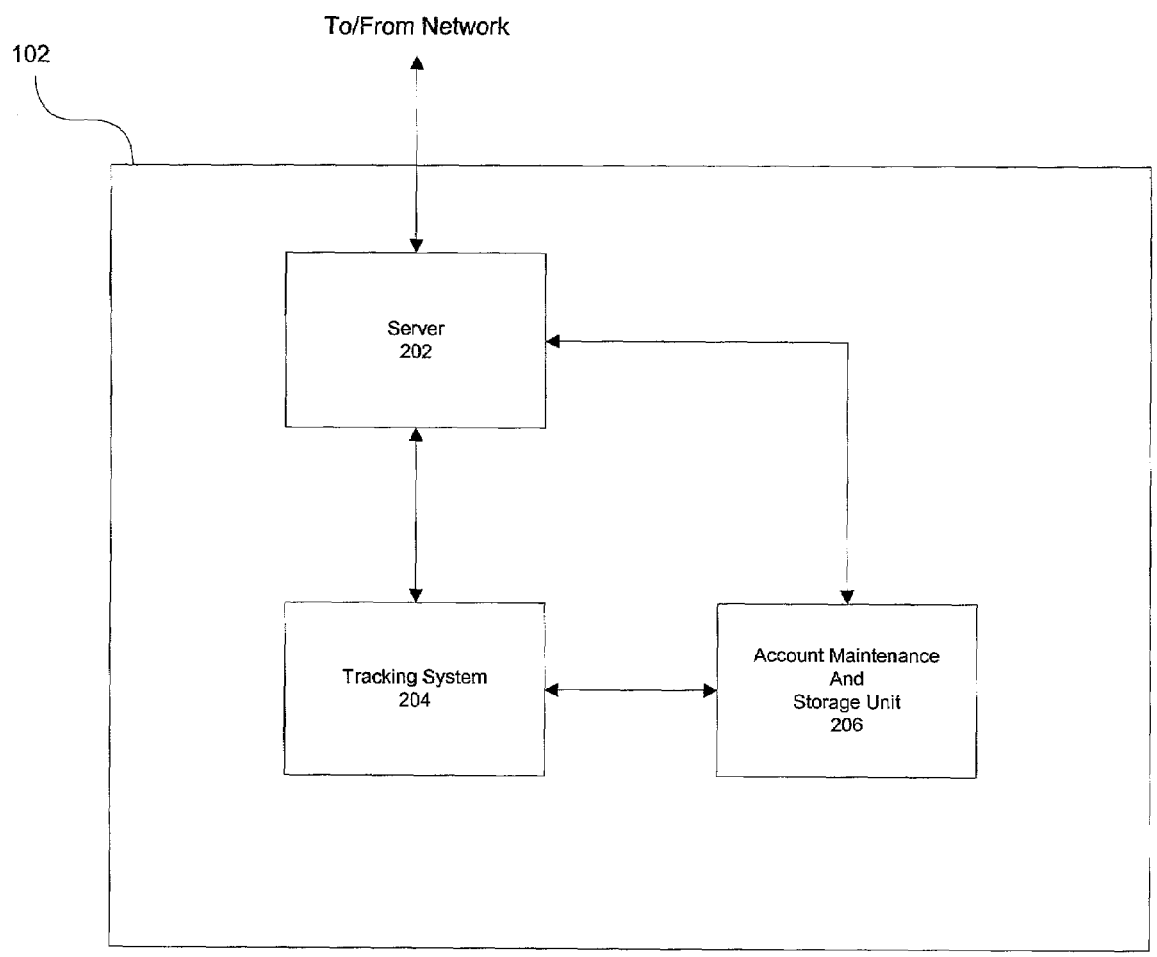
FIG. 2 is an exemplary diagram of a debt recovery service consistent with the present invention.

FIG. 2 is an exemplary diagram of the main system components for implementing debt recovery service 102, consistent with the principles of the invention. Debt recovery service 102 comprises server 202, tracking system 204, and account maintenance and storage unit 206. Server 202 connects debt recovery service 102 to a network (such as network 114 of FIG. 1). Server 202 also stores information pertaining to each customer whose account is part of a portfolio of delinquent accounts. The portfolio is the subject of a partnership between debt recovery service 102 and a partner (such as one of the partners 116A-116N). When a customer that is accepting a debt recovery offer contacts an agent (such as one of the agents 108A-108N), the agent can connect to server 202 via network 114 and access information concerning the customer.

For example, an agent may have access to a customer's delinquent account information from server 202 to facilitate communication with the customer. Account information may include data, such as the customer's name, social security number, address, phone number, amount of charged-off debt, dates for which the debt recovery offer are effective, last payment date/amount, or any other information related to the customer's debt.

Server 202 also receives debt recovery application information from the agent and submits this application information to tracking system 204 for processing. Tracking system 204 receives application information from server 202, confirms that the customer is not problematic, and books a debt recovery account (such as a debt recovery credit card account) on account maintenance and storage unit 206 for the customer. Account maintenance and storage unit 206 stores account information and adjusts the information as necessary. For example, for a debt recovery credit card, the account information may include, for example, balance data, credit limit data, and open to buy (OTB) data.

Figure 3:
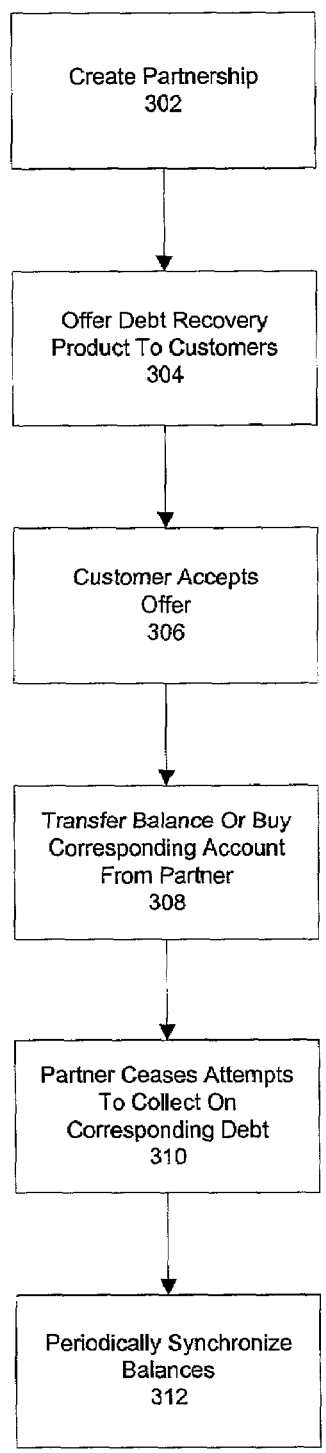
FIG. 3 is an exemplary flowchart of a method for providing a debt recovery partnership in a manner consistent with the present invention.

FIG. 3 is an exemplary flowchart for providing a debt recovery partnership in a manner consistent with the present invention. Debt recovery service 102 first seeks to become a partner with various business entities that it identifies (Step 302). These business entities may be businesses that own one or more portfolios of delinquent accounts (e.g., charged-off accounts). A business entity can be the original issuer of credit, such as a credit card company, bank, hospital, or other organization that initially extended a line of credit to a customer. Alternatively, a business entity can be a debt collection agency that bought a portfolio of delinquent accounts from the original issuer of credit or from another debt collection agency. Partners 116A-116N are business entities that agree to enter a partnership with debt recovery service 102. It is not necessary that debt recovery service 102 initially seek out partners; partners may initially seek debt recovery service 102.

Once one or more business entities, such as partners 116A-116N, agree to enter a partnership, the partner and debt recovery service 102 proceed to work the portfolio of delinquent accounts concurrently. Debt recovery service 102 offers a debt recovery credit card product or other debt recovery product to customers who have an account in the portfolio of delinquent accounts (Step 304). Debt recovery service 102 may use discretion in offering the debt recovery product. For example, debt recovery service 102 may not offer the product to a customer in the portfolio, if that customer is currently in prison. The debt recovery credit card or other debt recovery product enables a customer to transfer outstanding debt to an account issued by debt recovery service 102, so that debt can be paid off with manageable periodical payments.

Debt recovery service 102 may extend debt recovery offers in a variety of manners, including, for example, regular mail, telephone, electronic mail, or a web page. Alternatively, a partner or the partner's agents may send debt recovery offers to customers on behalf of debt recovery service 102. Note that debt recovery service 102 would still be the one actually extending the offer for the debt recovery product. Although debt recovery service 102 extends a plurality of debt recovery offers to customers, the portfolio of delinquent accounts is still owned by the relevant partner. Accordingly, partners may continue their attempts to collect payments on delinquent accounts.

A customer may accept a debt recovery offer, for example, via regular mail, telephone, electronic mail, or a web page (Step 306). Once a customer accepts an offer, debt recovery service 102 buys that customer's account from the partner that owns the account, if the customer is deemed non-problematic (Step 308). Alternatively, the debt recovery service may transfer the balances of those accounts to the debt recovery product, without buying the accounts, and pay the partner a commission for the transferred balances. Under a partnership agreement, debt recovery service 102 may pay more for the customer's account than a company would normally pay for an account in cases where a whole portfolio of accounts are purchased at one time. For example, whereas a company may pay less than one cent per dollar when purchasing an entire portfolio of debt, a company may agree to pay more than one cent per dollar under a partnership arrangement. Payment may be a purchase amount or merely a commission on a transferred balance.

Instead of debt recovery service 102 buying an account or paying a commission on transferred balances, other revenue sharing techniques may be implemented. For example, for debt recovery offers that have been accepted, the partner could get a first predetermined number of customer payments on the debt recovery product. Another option is to pay the partner (at a higher percentage) only for debt recovery accounts on which customers have made at least a predetermined number of payments in a predetermined number of months. Yet another option is for debt recovery service 102 and the partner to split the gross or net cash flows for a predetermined time period.

Once debt recovery service 102 buys the customer's delinquent account or pays a commission on a transferred balance, the partner who owns the account ceases attempts to collect on the account, because the account is no longer controlled by the partner (Step 310). Debt recovery service 102 and partners also work together for the purpose of periodically synchronizing the balances maintained by debt recovery service 102 (Step 312). For example, account information maintained by debt recovery service 102 may be periodically updated by information received from a partner. Account information sent to a customer may also need to be re-sent and/or modified, if debt recovery service 102 receives a notification that the customer sent additional payments to the partner before the debt recovery offer was accepted. Balance synchronization is more fully explained below with reference to FIGS. 5-9.

Figure 4:
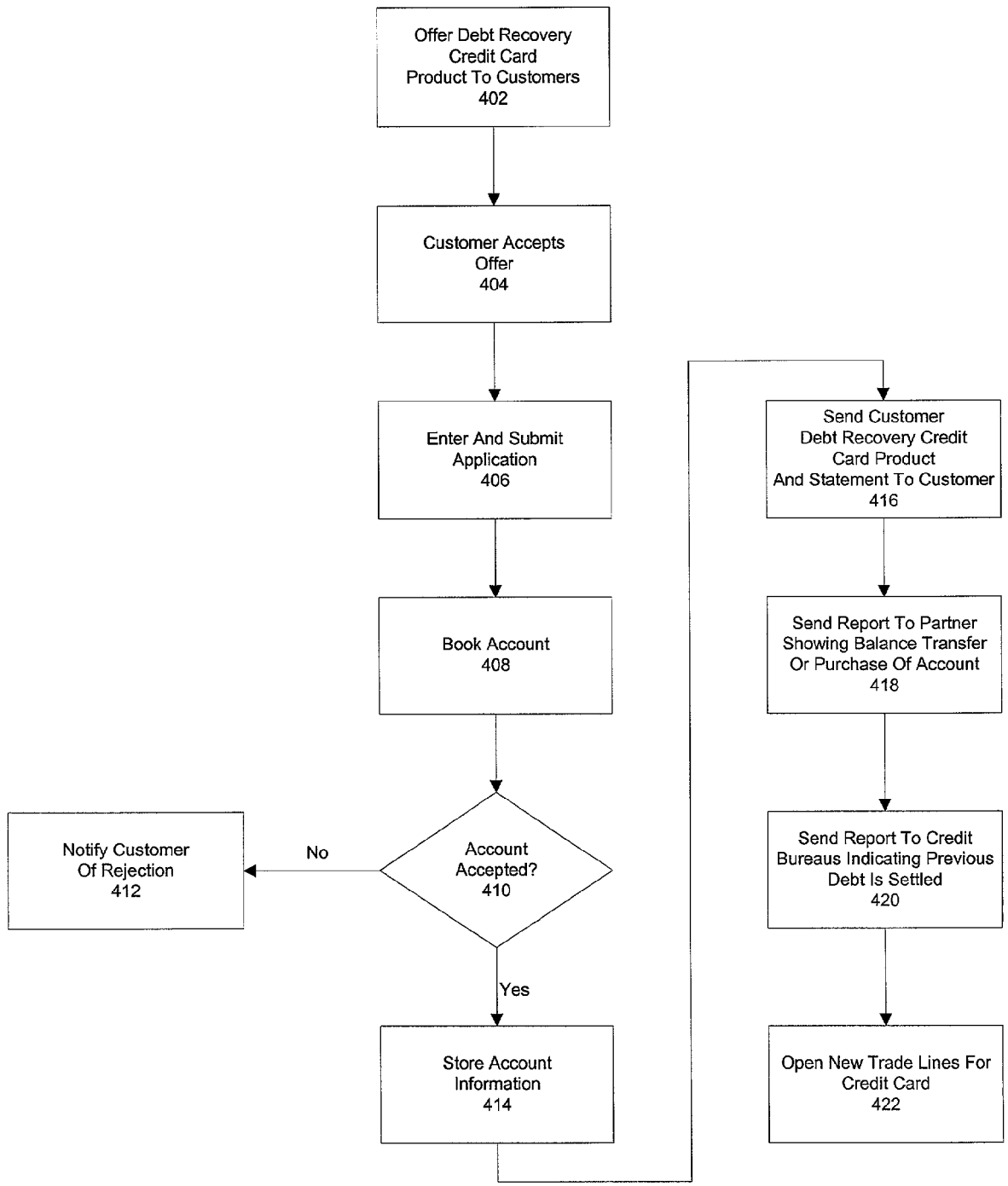
FIG. 4 is an exemplary flowchart of a method for offering and accepting a debt recovery credit card product in a manner consistent with the present invention.

FIG. 4 is an exemplary flowchart for offering and accepting a debt recovery credit card product, consistent with the principles of the present invention. Debt recovery service 102 offers a debt recovery credit card product to a number of customers (Step 402). A customer that decides to accept the offer may do so by responding, for example, through regular mail, telephone, electronic mail, or a web page (Step 404). For example, if a customer uses a telephone to accept the offer, an agent can handle the call by accessing account information corresponding to the customer and completing an electronic application on behalf of the customer. Regular mail, electronic mail, and web page responses can be similarly processed by an agent on behalf of customer(s) wishing to accept the debt recovery offer. Note that an agent does not necessarily need to have access to account information before the customer accepts the offer. Account information could be gathered from the customer when the offer is accepted (e.g., via telephone, regular mail, electronic mail, or web page). In any case, each customer may enter and submit an application to debt recovery service 102 via an agent (Step 406). Customers may also enter and submit applications without the aid of an agent (e.g., via a web page).

Upon receiving application information, server 202 forwards the information to tracking system 204, which proceeds to attempt to book an account for the customer (Step 408). Tracking system 204 determines whether the customer is a potential problem or risk. For example, tracking system 204 may access a database located locally or remotely to determine whether the customer has had any previous credit or fraud problems that make the customer a risk. Problem customers may or may not be accepted as new account holders. Based on the accessed information and policy set by debt recovery service 102, tracking system 204 determines whether or not the customer's account is to be accepted (Step 410). Typically, a small percentage of accounts (e.g., less than 5%) are rejected. If the customer's account is rejected by tracking system 204, then debt recovery service 102 notifies the customer of the rejection (Step 412). This rejection may be in the form of a written letter, telephone call, electronic mail, or other means of communication.

If the customer's account is accepted, then debt recovery service 102 sends the customer's delinquent account information to account maintenance and storage unit 206, where it is stored as debt recovery credit card account information (Step 414). Debt recovery credit card account information may include credit limit data, balance data, and OTB (open to buy) data. Debt recovery service 102 also notifies the customer of the acceptance and sends the customer the debt recovery credit card product along with an account statement (Step 416). The account statement includes an original credit limit, a current balance, and an original OTB. Debt recovery service 102 further sends a report to the relevant partner showing that the account has been purchased or has had its balance transferred to a debt recovery product (Step 418) and a report to credit bureaus 120 indicating that the customer's previous debt is now settled (Step 420). Alternatively, the partner may send the report to credit bureaus 120 indicating the customer's previous debt is now settled. Debt recovery service 102 also instructs credit bureaus 120 to open new trade lines for the customer's newly issued credit card (Step 422).

Figure 5:
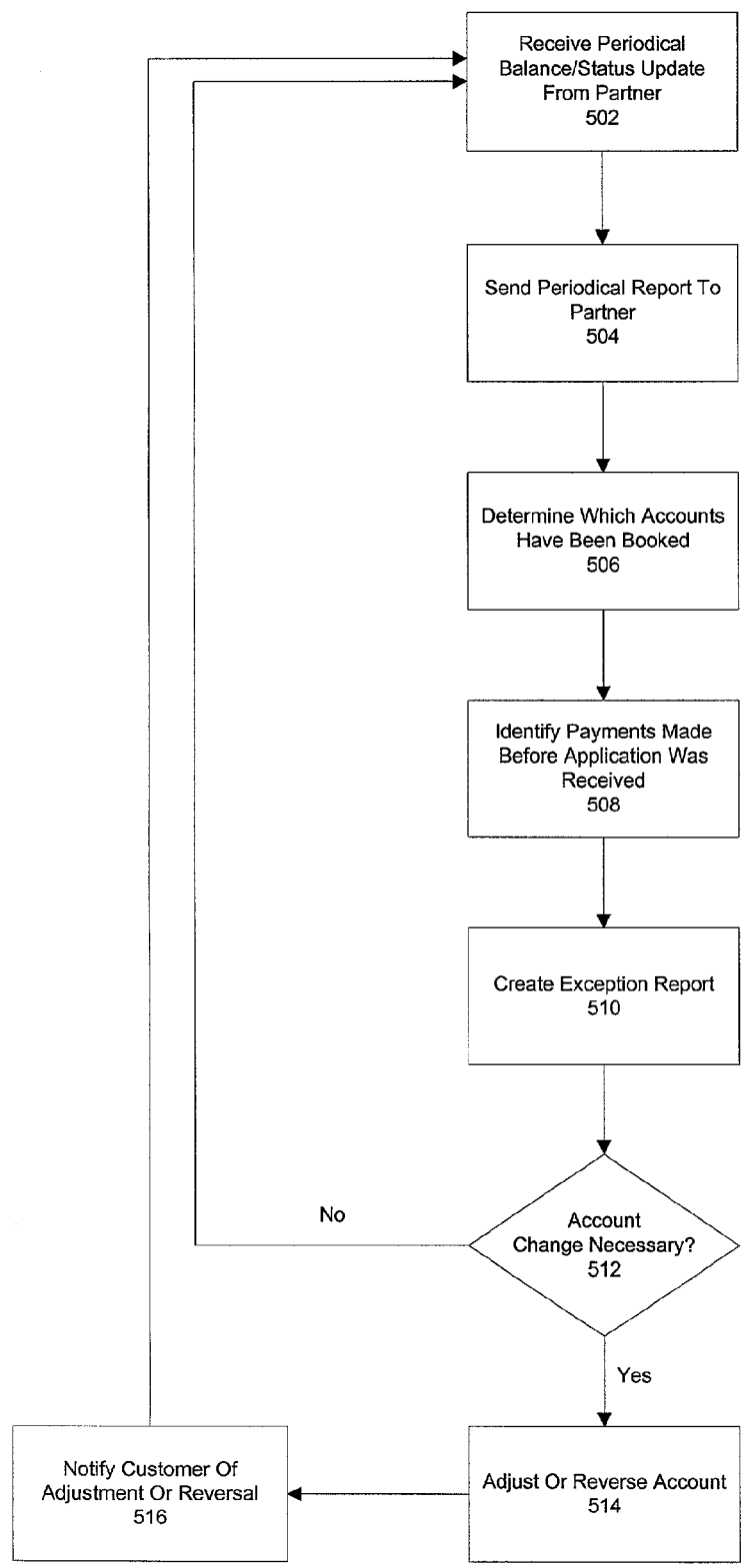
FIG. 5 is an exemplary flowchart of a method for periodically synchronizing balances in a manner consistent with the present invention.

FIG. 5 is an exemplary flowchart of a method for periodically synchronizing the balances of the accounts maintained by debt recovery service 102, consistent with the principles of the present invention. Debt recovery service 102 receives a periodical balance/status update from each of its partners (Step 502). A balance/status update includes information showing recent payments (e.g., payments since the last update) and total payments made by particular customers on their respective delinquent accounts, which are owned by the partner. The update also includes indications as to whether or not particular debt recovery offers are to remain valid. For example, after receiving a substantial payment from a customer, a customer may decide that its collection efforts are sufficient and a debt recovery offer is no longer necessary for the customer. Debt recovery service 102 also sends its partners a periodical report showing which delinquent accounts have been purchased, or which delinquent account balances have been transferred to a debt recovery product (Step 504).

Next, debt recovery service 102 determines which delinquent accounts referenced in the balance/status update have been booked as new debt recovery credit card accounts (Step 506). This determination may be made by checking the information stored in account maintenance and storage unit 206. Debt recovery service 102 then examines any delinquent accounts that have been booked to identify any recent payments (e.g., payments since the last update) made before a customer's application for a debt recovery product was received (Step 508). For example, a customer might send a partner a payment on a delinquent account before the customer accepts a debt recovery offer, but after the partner has sent debt recovery service 102 a balance/status update. In that case, debt recovery service 102 issued the customer a debt recovery credit card that has a higher OTB and/or higher credit limit than would normally be issued for the customer (the customer may not owe as much as initially indicated). Accordingly, some of the credit card account information sent to the customer with the debt recovery product may be incorrect. When debt recovery service 102 identifies such a payment, it notes the amount of the payment and whether or not that payment is considered large or small. For example, a payment may be considered a large payment if the payment totals more than half the cut-off date balance. The cut-off date balance is the balance on the account on the day the account is officially charged-off. Conversely, a payment may be considered a small payment if the payment totals less than half the cut-off date balance. Note that whether a payment is considered large or small is at the discretion of debt recovery service 102 (e.g., debt recovery service 102 can adjust what constitutes a large or small payment).

Debt recovery service 102 makes the payments identified in Step 508 the subject of an exception report that it creates (Step 510). This exception report may be sent to an agent for handling. For example, an agent can examine an exception report and determine whether any account change is necessary (Step 512). Alternatively, account maintenance and storage unit 206 may automatically make this determination without the aid of an agent. An account change is necessary whenever payments identified in Step 508 create a discrepancy in the actual credit card account information and the information initially reported to the customer upon reception of the debt recovery product. In the case that no account change is necessary, debt recovery service 102 does not have to immediately perform further processing, and it can wait to receive the next balance/status update.

If an account change is necessary, an agent or account maintenance and storage unit 206 may adjust or reverse (e.g., cancel) the debt recovery credit card account (Step 514). For example, when a small payment has been received, the credit card account balance is appropriately adjusted. When a large payment that falls short of full payment has been received, the credit limit is lowered an appropriate amount. For example, the credit limit and not the balance is adjusted, when a large payment is received by a partner, because it is not fair to debt recovery service 102, if the customer has a large available balance (e.g., OTB) before the debt recovery service has gotten any payments on the account it just paid the partner for (the partner, not the debt recovery service, received the large payment). The partner is entitled to keep any payments received before the debt recovery offer was accepted, but must forward payments received after the recovery offer was accepted to debt recovery service 102.

When full payment has been received, the debt recovery credit card account is reversed (e.g., cancelled), because no more debt exists. Subsequently, debt recovery service 102 notifies the customer of the credit card account adjustment (e.g., a balance or credit limit change) or reversal (Step 516). Debt recovery service 102 can then wait to receive the next balance/status update.

Figure 6:
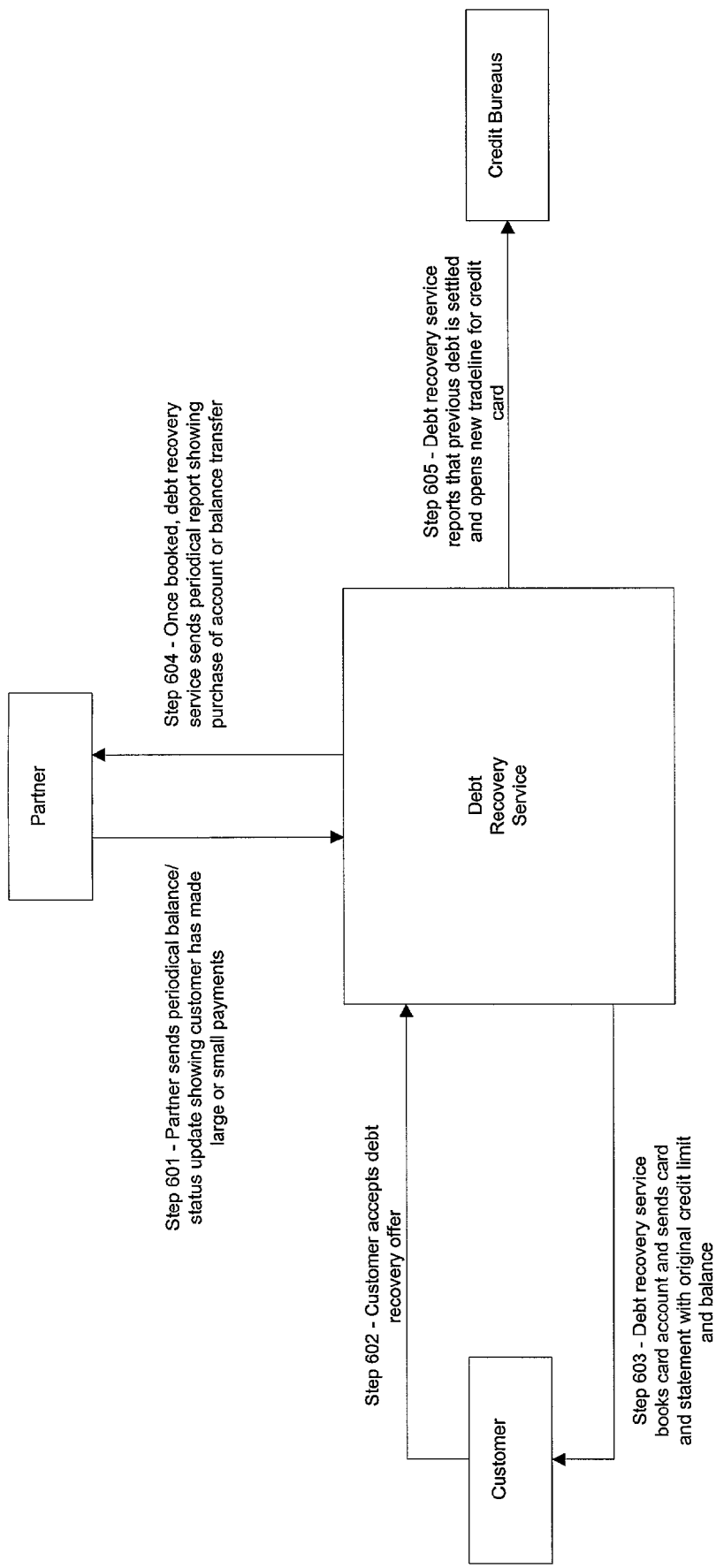
FIG. 6 is an exemplary diagram showing balance synchronization involving large or small payments.

FIG. 6 is an exemplary diagram showing balance synchronization involving large or small payments. First, a partner sends the debt recovery service a periodical balance/status update showing that a customer has made either large or small payments on a delinquent account (Step 601). Small payments are payments, for example, that total less than half the cut-off date balance (e.g., the balance on the account the day the account was initially charged-off). Large payments are payments, for example, that total more than half the cut-off date balance. The debt recovery service can decide whether payments equaling half the cut-off date balance are designated as small or large payments.

Sometime after the partner sends the update, the customer accepts a debt recovery offer using a telephone, electronic mail, a web page, or regular mail (Step 602). The debt recovery service proceeds to book the delinquent account, if possible and sends the debt recovery credit card product to the customer along with an account statement showing an original credit limit, current balance, and original OTB (Step 603). When the account is booked for a debt recovery credit card product, the debt recovery service transfers the delinquent account balance to the debt recovery credit card product, without buying the account, and pays the partner a commission for the transferred balance (alternatively, the debt recovery service may purchase the delinquent account). The debt recovery service also sends the partner an indication that the delinquent account balance was transferred (e.g., the customer accepted the offer) or that the account was purchased, in its periodical report (Step 604). In addition, the debt recovery service reports to the credit bureaus that the previous debt for the delinquent account is settled and opens a new trade line for the debt recovery credit card product (Step 605). The partner may report that the delinquent account is settled, instead of the debt recovery service.

Figure 7:
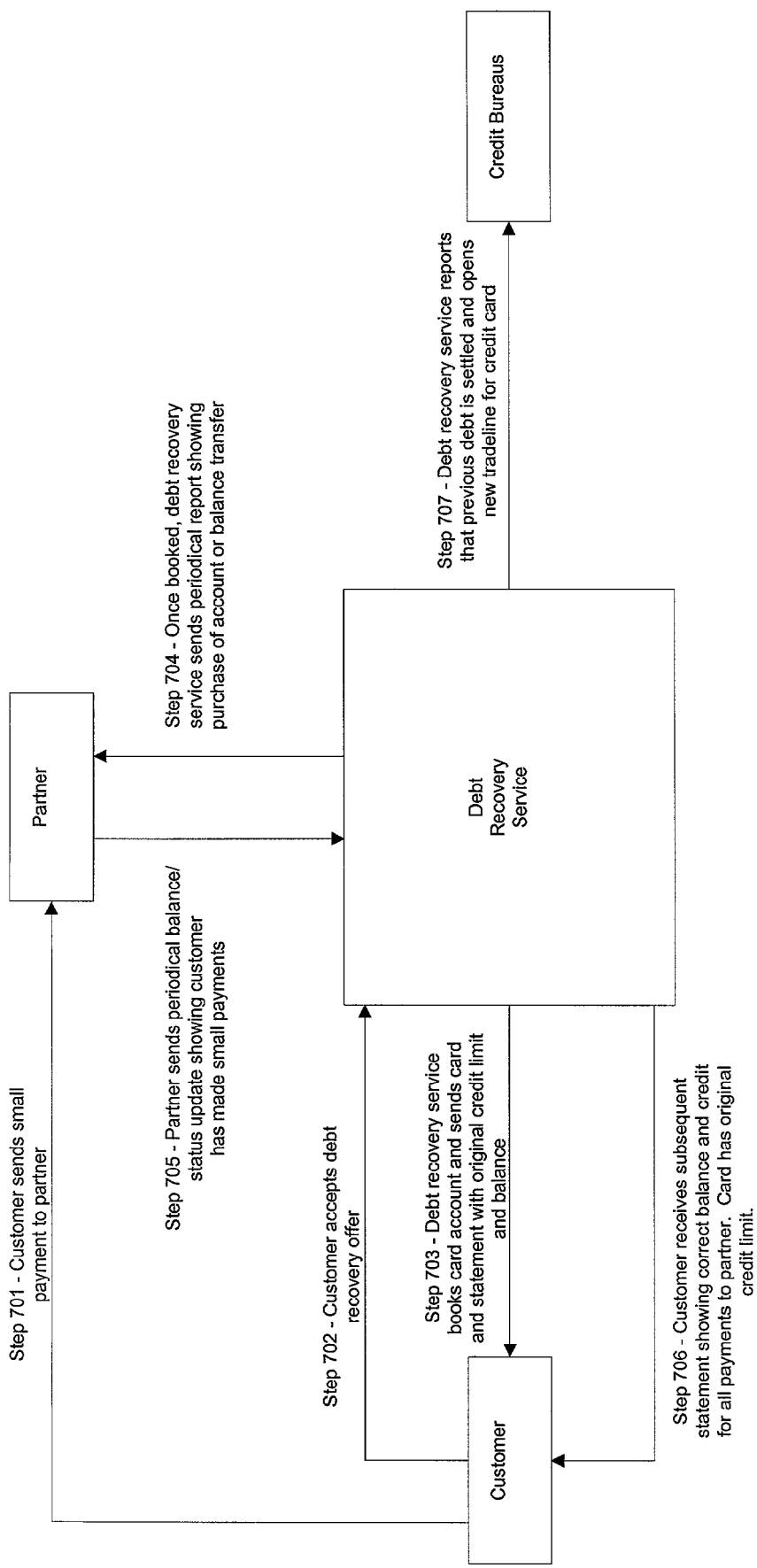
FIG. 7 is an exemplary diagram showing balance synchronization involving small payments.

FIG. 7 is an exemplary diagram showing balance synchronization involving small payments. First, a customer sends a small payment to a partner (Step 701). The customer then accepts a debt recovery offer using a telephone, electronic mail, a web page, or regular mail (Step 702). The debt recovery service proceeds to book the delinquent account, if possible and sends the debt recovery credit card product to the customer along with an account statement showing an original credit limit, current balance, and original OTB (Step 703). When the account is booked for a debt recovery credit card product, the debt recovery service transfers the delinquent account balance to the debt recovery credit card product, without buying the account, and pays the partner a commission for the transferred balance (alternatively, the debt recovery service may purchase the delinquent account). The debt recovery service also sends the partner an indication that the delinquent account balance was transferred (e.g., the customer accepted the offer) or that the account was purchased, in its periodical report (Step 704). Sometime after the customer accepted the offer (but not necessarily before or after the debt recovery service sends the report), the partner sends the debt recovery service a periodical balance/status update showing that a customer has made small payments on a delinquent account (Step 705).

Because the partner reported the small payment after the debt recovery credit card account was booked, the information in the account statement may be inaccurate. To ensure that the customer is informed of the correct account information, the debt recovery service sends the customer a subsequent statement showing the correct balance and credit for all payments made to the partner (Step 706). Because small payments were involved in this case, the credit card has its original credit limit and OTB. In addition, the debt recovery service reports to the credit bureaus that the previous debt for the delinquent account is settled and opens a new trade line for the debt recovery credit card product (Step 707). The partner may report that the delinquent account is settled, instead of the debt recovery service.

Figure 8:
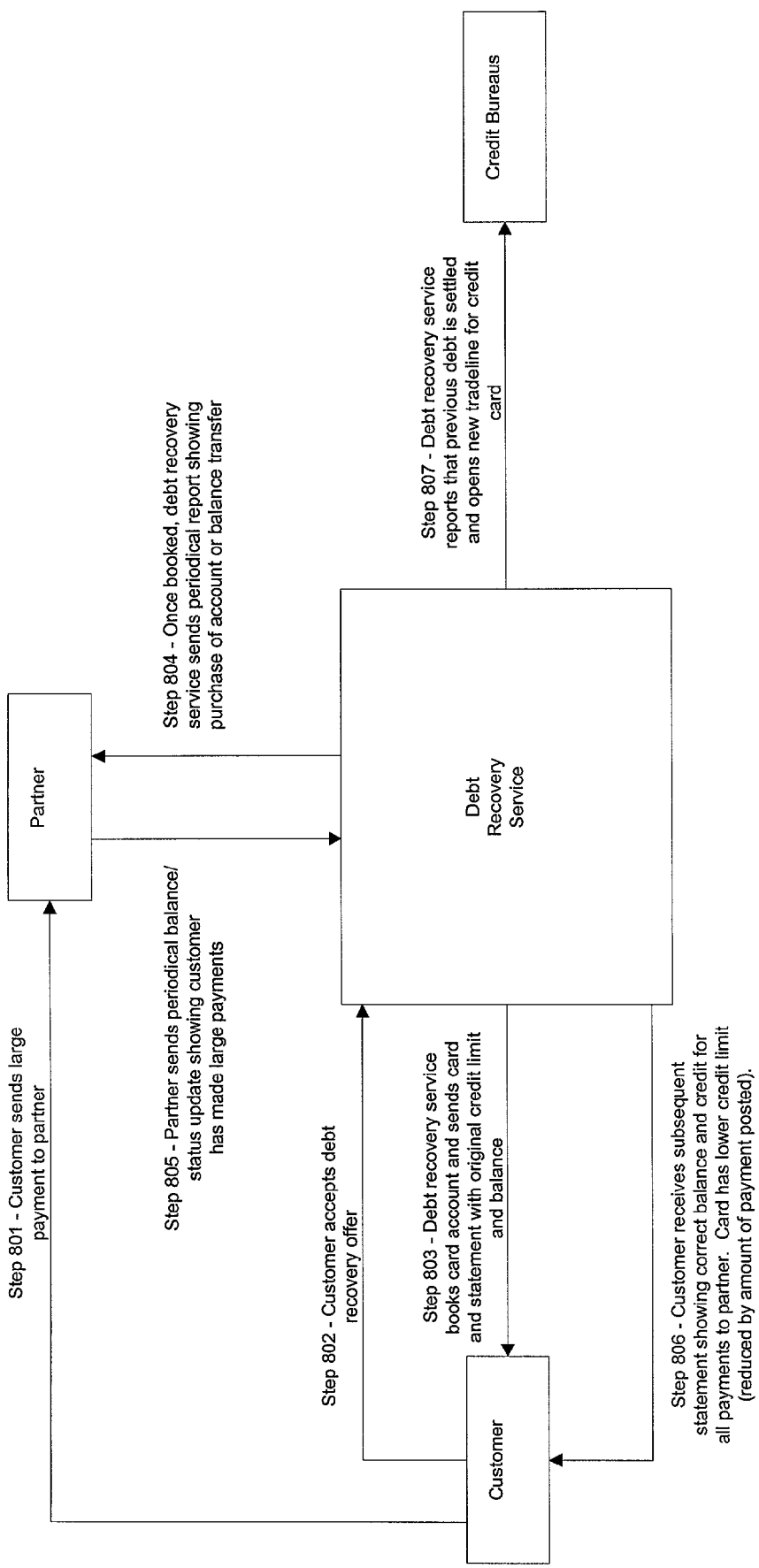
FIG. 8 is an exemplary diagram showing balance synchronization involving large payments.

FIG. 8 is an exemplary diagram showing balance synchronization involving large payments. First, a customer sends a large payment to a partner (Step 801). The customer then accepts a debt recovery offer using a telephone, electronic mail, a web page, or regular mail (Step 802). The debt recovery service proceeds to book the delinquent account, if possible and sends the debt recovery credit card product to the customer along with an account statement showing an original credit limit, current balance, and original OTB (Step 803). When the account is booked for a debt recovery credit card product, the debt recovery service transfers the delinquent account balance to the debt recovery credit card product, without buying the account, and pays the partner a commission for the transferred balance (alternatively, the debt recovery service may purchase the delinquent account). The debt recovery service also sends the partner an indication that the delinquent account balance was transferred (e.g., the customer accepted the offer) or that the account was purchased, in its periodical report (Step 804). Sometime after the customer accepted the offer (but not necessarily before or after the debt recovery service sends the report), the partner sends the debt recovery service a periodical balance/status update showing that a customer has made large payments on a delinquent account (Step 805).

Because the partner reported the large payment after the debt recovery credit card account was booked, the information in the account statement may be inaccurate. To ensure that the customer is informed of the correct account information, the debt recovery service sends the customer a subsequent statement showing the correct balance and credit for all payments made to the partner (Step 806). Large payments were involved in this case, so the credit card has its original OTB and a lower credit limit. The credit limit is lowered by an amount corresponding to the amount of payment posted. In addition, the debt recovery service reports to the credit bureaus that the previous debt for the delinquent account is settled and opens a new trade line for the debt recovery credit card product (Step 807). The partner may report that the delinquent account is settled, instead of the debt recovery service.

In some cases, a customer may either settle in full or pay in full a delinquent account. But due to confusion, the customer may attempt to accept a debt recovery offer for that account. If the debt recovery service learns of the settlement or full payment before learning of the debt recovery acceptance, then an agent can simply explain to the customer that the offer is no longer valid because the debt has been satisfied. If the debt recovery service has already sent the customer a debt recovery credit card product before learning that the account was settled or paid in full, then the debt recovery service may contact the customer to inform him or her that the debt recovery credit card has been cancelled since the debt is satisfied. The debt recovery service also needs to manually delete the corresponding trade lines from the credit bureaus.

In the case that the debt recovery offer has expired before acceptance by the customer, the debt recovery service or its agents inform the customer that the offer has expired and no credit card will be issued. An offer may expire, for example, when the offer has been outstanding for a predetermined maximum period of time, or the partner has explicitly indicated that an offer should no longer be valid.

Figure 9:
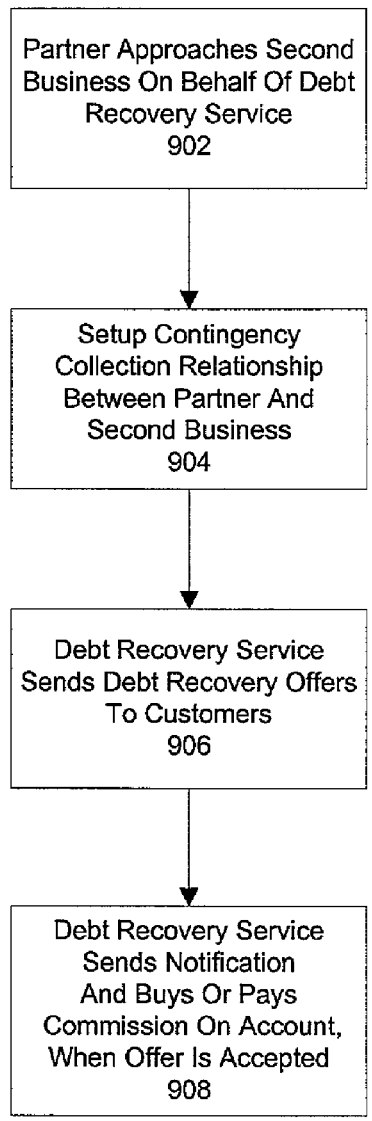
FIG. 9 is an exemplary flowchart of a method for providing an extended debt recovery partnership in a manner consistent with the present invention.

While the present invention has been described in connection with various embodiments, many modifications will be readily apparent to those skilled in the art. For example, FIG. 9 is an exemplary flowchart of a method for providing an extended debt recovery partnership in a manner consistent with the present invention. A first business (e.g., partner 116A) already involved in a partnership with debt recovery service 102 may approach a second business on behalf of debt recovery service 102, for the purpose of selling the services that debt recovery service 102 offers (Step 902). This second business may be an original issuer of credit or a company, such as a outsourcing agency, that has bought a portfolio of delinquent accounts from another company.

If the second business agrees to become part of an extended partnership involving both debt recovery service 102 and the first business, then the first and second business set up, for example, a contingency collection relationship (if they are not already involved in such a relationship) (Step 904). A contingency collection relationship, for example, refers to an arrangement between an outsourcing agency and a credit issuer, where the outsourcing agency does not buy a portfolio of debt, and payments received by the outsourcing agency are split with the credit issuer (i.e., 40% for the outsourcing agency, 60% for the credit issuer).

Debt recovery service 102 then sends debt recovery offers to a number of customers (Step 906). These offers appear, to the customers, to come from the second business (e.g., the offers could have letterhead or other indicia associated with the second business). When a customer accepts an offer, debt recovery service 102 sends a notification to the first business and buys or pays a commission on the relevant account (Step 908). The money from the purchase or commission can then be split between the first and second business according to their contingency collection relationship. As a result of an extended partnership as described above, debt recovery service 102 is able to establish relationships with many more businesses without having to establish a synchronization process with each new business. Further, it is only necessary for debt recovery service 102 to establish synchronization with the first business.

While aspects of the invention have been described with reference to debt recovery credit card products, the features of the invention may be adopted for other debt recovery products such as loans (including installment loans) or agreements to buy a product or service from another company (e.g., the debt recovery service would be willing to forgive all or some of a customer's debt if the customer agrees to buy his or her next cell phone from Sprint). One skilled in the art will also appreciate that all or part of the systems and methods consistent with the present invention may be stored on or read from computer-readable media, such as secondary storage devices, like hard disks, floppy disks, and CD-ROM; a carrier wave received from a network such as the Internet; or other forms of ROM or RAM. The invention, therefore is not limited to the disclosure herein, but is intended to cover any adaptations or variations thereof.

What is claimed is:

1. A system for attempting to collect payments from customers having delinquent accounts concurrently with a partner that owns the delinquent accounts, comprising:
    means for extending an offer for a debt recovery product to a customer with a delinquent account;
    means for receiving an acceptance to the offer from the customer; and
    means for paying, for each customer that accepts the offer, a commission to the partner for a corresponding delinquent account,
    wherein the partner ceases attempts to collect payments on each delinquent account corresponding to an accepted offer and continues attempts to collect payments on delinquent accounts not corresponding to an accepted offer.

2. The system of claim 1, wherein the debt recovery product comprises a debt recovery credit card product, and wherein the system further comprises:
    means for booking a debt recovery credit card account for each customer that accepts the offer.

3. The system of claim 1, wherein the debt recovery product comprises a debt recovery credit card product, and wherein the system further comprises:
    means for transferring a balance of a delinquent account corresponding to an accepted offer to the debt recovery credit card product;
    means for sending debt recovery credit card account information to the customer;
    means for reporting the balance transfer to the partner; and
    means for informing at least one credit bureau that the delinquent account corresponding to an accepted offer is settled.

4. The system of claim 3, further comprising:
   means for modifying the debt recovery credit card account information when a debt recovery service receives, after the acceptance to the offer was received by the debt recovery service, notification of a customer payment to the partner.

5. The system of claim 4, wherein the debt recovery credit card account information comprises balance information and credit limit information, and wherein said means for modifying further comprises:
   means for adjusting the balance information when it is determined that the customer made a small payment to the partner before the acceptance to the offer was received by the debt recovery service.

6. The system of claim 5, wherein said means for modifying further comprises:
   means for adjusting the credit limit information when it is determined that the customer made a large payment to the partner before the acceptance to the offer was received by the debt recovery service.

7. The system of claim 4, further comprising:
   means for sending the customer updated debt recovery credit card account information.

8. The system of claim 1, wherein the delinquent account is a charged-off account.

9. The system of claim 1, wherein the debt recovery product comprises one of a debt recovery credit card product, a loan, or an agreement to buy a product or service from another company.

10. A system for synchronizing accounts in debt recovery, comprising:
    means for receiving an update from a partner reporting a payment collected from a customer having a delinquent account;
    means for determining whether the delinquent account has been booked as a debt recovery credit card account;
    means for determining whether the payment was made before a debt recovery credit card application for the debt recovery credit card account was received; and
    means for modifying debt recovery credit card account information based on a determination that the payment was made to the partner before the debt recovery credit card application was received.

11. The system of claim 10, wherein the partner ceases attempts to collect payments on delinquent accounts corresponding to accepted debt recovery product offers and continues attempts to collect payments on delinquent accounts not corresponding to accepted debt recovery product offers.

12. The system of claim 10, wherein the debt recovery credit card account information comprises balance information and credit limit information, and wherein said means for modifying comprises:
    means for adjusting the balance information when it is determined that a small payment was made to the partner before the debt recovery credit card application was received.

13. The system of claim 12, wherein said means for modifying further comprises:
    means for adjusting the credit limit information when it is determined that a large payment was made to the partner before the debt recovery credit card application was received.

14. The system of claim 10, further comprising:
    means for sending the customer updated debt recovery credit card account information.

15. The system of claim 10, wherein the delinquent account is a charged-off account.

* * * * *